A. JOHNSON.
DEVICE FOR REMOVING BUSHINGS AND THE LIKE.
APPLICATION FILED NOV. 20, 1917.
1,341,132.
Patented May 25, 1920.
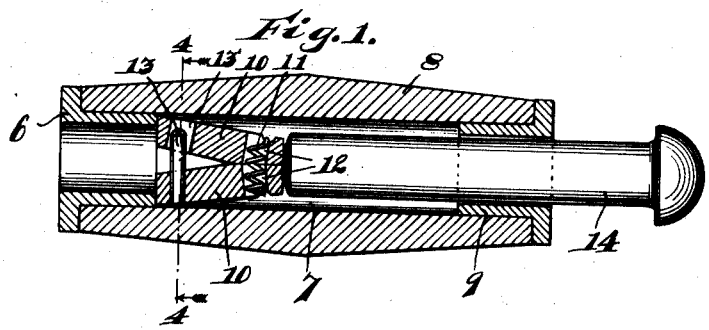
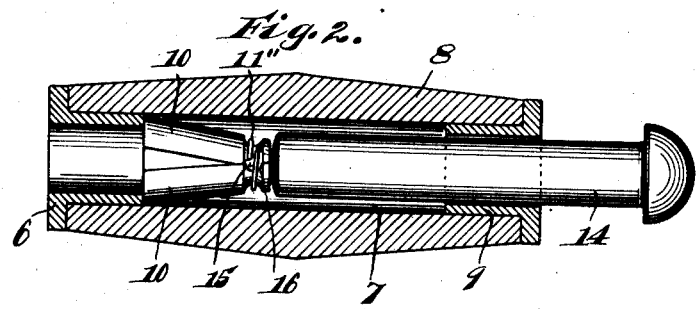
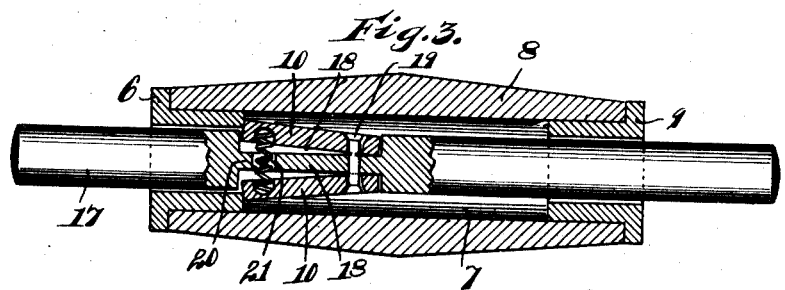
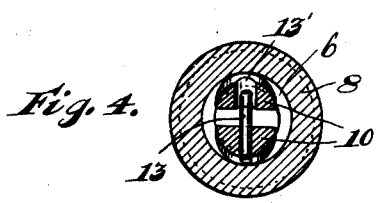
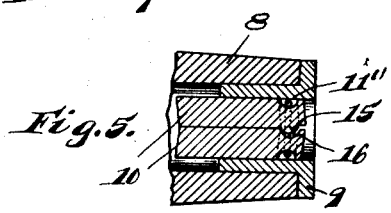
Witnesses:
C. E. Wessels
A. A. Olson
Inventor:
Alfred Johnson,
By Joshua R. H. Potts
his Attorney.

UNITED STATES PATENT OFFICE.

ALFRED JOHNSON, OF CHICAGO, ILLINOIS.

DEVICE FOR REMOVING BUSHINGS AND THE LIKE.

1,341,132.   Specification of Letters Patent.   Patented May 25, 1920.

Application filed November 20, 1917. Serial No. 202,920.

*To all whom it may concern:*

Be it known that I, ALFRED JOHNSON, a citizen of the United States, and a resident of the city of Chicago, county of Cook, and State of Illinois, have invented certain new and useful Improvements in Devices for Removing Bushings and the like, of which the following is a specification.

My invention relates to improvements in devices designed for use in the removal of bushings and the like from openings in which the same are mounted, particularly where the rearward end of the opening, in which the bushing or member to be removed is mounted, is of reduced size, that is of a diameter equal to or less than the internal diameter of the bushing or member to be removed.

The object of my invention is the production of a device of the character mentioned which will be of durable and economical construction and efficient in use.

Other objects will appear hereinafter.

The invention consists in the combinations and arrangements of parts hereinafter described and claimed.

The invention will be best understood by reference to the accompanying drawings forming a part of this specification, and in which, Figure 1 is a central section through a hub or tubular element having bushings in its ends, in conjunction with which is shown a bushing remover embodying the invention, Fig. 2, a view similar to Fig. 1 illustrating another form of the invention, Fig. 3, a view similar to Fig. 1 illustrating still another form of the invention, Fig. 4, a section taken on substantially line 4—4 of Fig. 1, and Fig. 5, a fragmental section illustrating the device in collapse condition or the condition thereof during insertion into the rearward end of the opening for engagement with the bushing which it is desired to remove.

As illustrated in the drawings, the device is shown in conjunction with a bushing 6, which it is desired to remove from the opening 7 in a tubular member or hub 8. In the rearward end of the member 8 is shown a similar bushing 9 which precludes the possibility of inserting into the rearward end of the opening 7 a pin or tool of a diameter greater than that of the internal diameter of bushing 6, the bushings 6 and 9 being of the same internal diameter.

The device comprises a pair of semi-cylindrical sections 10, corresponding ends of which are yieldingly connected by a helical tension spring 11. The spring 11 is arranged in registering openings 12 formed in said ends of said sections, the ends of said spring being suitably secured to the outer sides of said sections. The inner sides of said ends of said sections are beveled so that said spring, which normally holds said ends in close proximity with each other, will thereby serve to normally hold the opposite ends of said sections in divergent positions. Said sections are held against relative lateral shifting by means of a pin 13 secured in one section, which loosely engages with an opening 13' formed in the other section.

In using the device, the same will first be collapsed, as seen in Fig. 5, to permit of insertion thereof through the bushing 9. Upon insertion the sections 10, under the influence of the spring coöperating therewith, will automatically rock to divergent positions so that the divergent ends thereof will be adapted to engage against the inner end of the bushing 6. By means of a pin or bolt 14 inserted through the bushing 9 into engagement with the rearward end of the device, and blows directed by means of a hammer or other tool against the outer end of the member 14, it will of course be seen that the bushing 6 may be readily dislodged.

The form shown in Fig. 2 is substantially the same as that described, except that in lieu of a tension spring 11, a torsional spring 11" is employed, which snugly embraces the rearward ends of the sections 10. Said sections are circumferentially grooved to accommodate said spring 11". In this form also in lieu of the pin 13, and opening 13' for holding the sections against relative lateral shifting, one of the sections 10 is formed at its rearward end with a transversely extending tooth or rib 15, which interlocks with a recess or groove 16 provided in the other section as clearly seen in Figs. 2 and 5.

In the form shown in Fig. 3, the sections 10 are mounted upon a carrier 17 which corresponds with the pin or bolt 14 of the forms above described. In this form however the member 17 is cut away at opposite sides as at 18 to accommodate the sections 10, the latter being connected with the member 17 by means of a rivet 19 with opposite ends of which said sections loosely engage. The free ends of said sections, in this form, are normally held in outward positions by means of a helical compression spring 20 which passes through an opening 21 formed in said member 17. The operation of all forms is, however, substantially the same.

While I have illustrated and described the preferred forms of construction for carrying my invention into effect, these are capable of variation and modification without departing from the spirit of the invention. I, therefore, do not wish to be limited to the precise details of construction set forth, but desire to avail myself of such variations and modifications as come within the scope of the appended claim.

Having described my invention what I claim as new and desire to secure by Letters Patent is:

A device for removing bushings and the like comprising an expansible element, said element comprising a plurality of relatively pivotal sections; and resilient means, independent of said sections, for normally holding corresponding ends of said sections in close proximity with each other and the opposite ends of said sections in divergent positions, substantially as described.

In witness whereof I have signed my name to this specification in the presence of two subscribing witnesses.

ALFRED JOHNSON.

Witnesses:
JOSHUA R. H. POTTS,
MILDRED E. ANDERSON.